(12) United States Patent
Sengupta et al.

(10) Patent No.: US 12,086,895 B2
(45) Date of Patent: Sep. 10, 2024

(54) AUTOMATED NEGOTIATION AGENT ADAPTATION

(71) Applicant: NEC CORPORATION, Tokyo (JP)

(72) Inventors: Ayan Sengupta, Tokyo (JP); Yasser Farouk Othman Mohammad, Tokyo (JP); Shinji Nakadai, Tokyo (JP)

(73) Assignee: NEC CORPORATION, Tokyo (JP)

(*) Notice: Subject to any disclaimer, the term of this patent is extended or adjusted under 35 U.S.C. 154(b) by 421 days.

(21) Appl. No.: 17/575,908

(22) Filed: Jan. 14, 2022

(65) Prior Publication Data
US 2023/0196487 A1  Jun. 22, 2023

Related U.S. Application Data

(60) Provisional application No. 63/292,383, filed on Dec. 21, 2021.

(51) Int. Cl.
| | | |
|---|---|---|
| G06Q 50/18 | (2012.01) | |
| G06N 20/20 | (2019.01) | |
| G06Q 30/06 | (2023.01) | |
| G06Q 30/0601 | (2023.01) | |

(52) U.S. Cl.
CPC ........... *G06Q 50/188* (2013.01); *G06N 20/20* (2019.01); *G06Q 30/0617* (2013.01)

(58) Field of Classification Search
None
See application file for complete search history.

(56) References Cited

U.S. PATENT DOCUMENTS

| | | | |
|---|---|---|---|
| 10,482,554 B1 * | 11/2019 | Vukich | G06N 3/063 |
| 11,494,818 B2 * | 11/2022 | Zeng | G06Q 30/0611 |
| 11,521,281 B2 * | 12/2022 | Sunder | G06N 3/006 |
| 11,907,820 B2 * | 2/2024 | Alagianambi | G10L 25/63 |
| 2013/0191238 A1 | 7/2013 | Ozonat et al. | |
| 2013/0218720 A1 | 8/2013 | Ozonat et al. | |

(Continued)

FOREIGN PATENT DOCUMENTS

| | | |
|---|---|---|
| EP | 0834824 A1 | 4/1998 |
| EP | 1041500 A2 | 10/2000 |

(Continued)

OTHER PUBLICATIONS

Lewis, M., et al., "Deal or no deal? Training AI bots to negotiate," AI Research ML Applications, https://engineering.tb.com/2017/06/14/ml-applications/deal-or-no-deal-training-ai-bots-to-negotiate/, Jun. 14, 2017. (Year: 2017).*

(Continued)

*Primary Examiner* — Nicholas D Rosen
(74) *Attorney, Agent, or Firm* — HAUPTMAN HAM, LLP

(57) ABSTRACT

Automated negotiation agent adaptation is performed by detecting change in a utility function involved in automated negotiation between a supporting agent and an opposing agent while the supporting agent operates according to a first negotiation strategy model, generating a plurality of training samples from automated negotiation between the supporting agent and the opposing agent while the supporting agent operates according to a baseline negotiation strategy model, and training an initialized negotiation strategy model using the plurality of training samples to produce a second negotiation strategy model.

20 Claims, 7 Drawing Sheets

(56) References Cited

U.S. PATENT DOCUMENTS

| | | | |
|---|---|---|---|
| 2017/0287038 A1* | 10/2017 | Krasadakis | G06Q 30/0201 |
| 2020/0020061 A1 | 1/2020 | Sunder et al. | |
| 2020/0168231 A1* | 5/2020 | Alagianambi | G06Q 40/02 |
| 2021/0049660 A1 | 2/2021 | Zeng et al. | |
| 2021/0383444 A1* | 12/2021 | Mauguin | G06Q 30/0641 |
| 2022/0108412 A1* | 4/2022 | Sengupta | G06Q 50/188 |
| 2022/0292535 A1* | 9/2022 | Ando | G06Q 50/188 |
| 2022/0318870 A1* | 10/2022 | Ando | G06Q 30/0617 |
| 2022/0335292 A1* | 10/2022 | Aoki | G06N 3/006 |
| 2022/0366483 A1* | 11/2022 | Mohammad | G06Q 30/08 |
| 2023/0139380 A1* | 5/2023 | Hamlin | G06N 20/00 |
| | | | 707/694 |

FOREIGN PATENT DOCUMENTS

| | | |
|---|---|---|
| WO | 2020172692 A2 | 8/2020 |
| WO | 2021070732 A1 | 4/2021 |

OTHER PUBLICATIONS

Siqi Chen et al., "Transfer learning for bilateral multi-issue negotiation", Proceedings of the 24th Benelux Conference on Artificial Intelligence (BNAIC), 2012. 9pp.

Ryohei Kawata et al., "Meta-Strategy for Multi-Time Negotiation: A Multi-Armed Bandit Approach", Proceedings of the 18th International Conference on Autonomous Agents and Multi Agent Systems, May 13-17, 2019. Canada, 3pp.

International Search Report in PCT/JP2022/047222, mailed Mar. 20, 2023. 3pp.

* cited by examiner

AUTOMATED NEGOTIATION AGENT ADAPTATION

PRIORITY CLAIM AND CROSS-REFERENCE

This application claims priority to U.S. Provisional Application No. 63/292,383, filed Dec. 21, 2021, the entire contents of which are hereby incorporated by reference in their entirety.

BACKGROUND

Negotiation is a process of decision making between two or more parties who aim to reach a mutually beneficial agreement. Automated negotiation involves negotiation among automated agents acting on behalf of real-world entities to achieve mutually beneficial agreements with reduced time and effort involved in the negotiation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
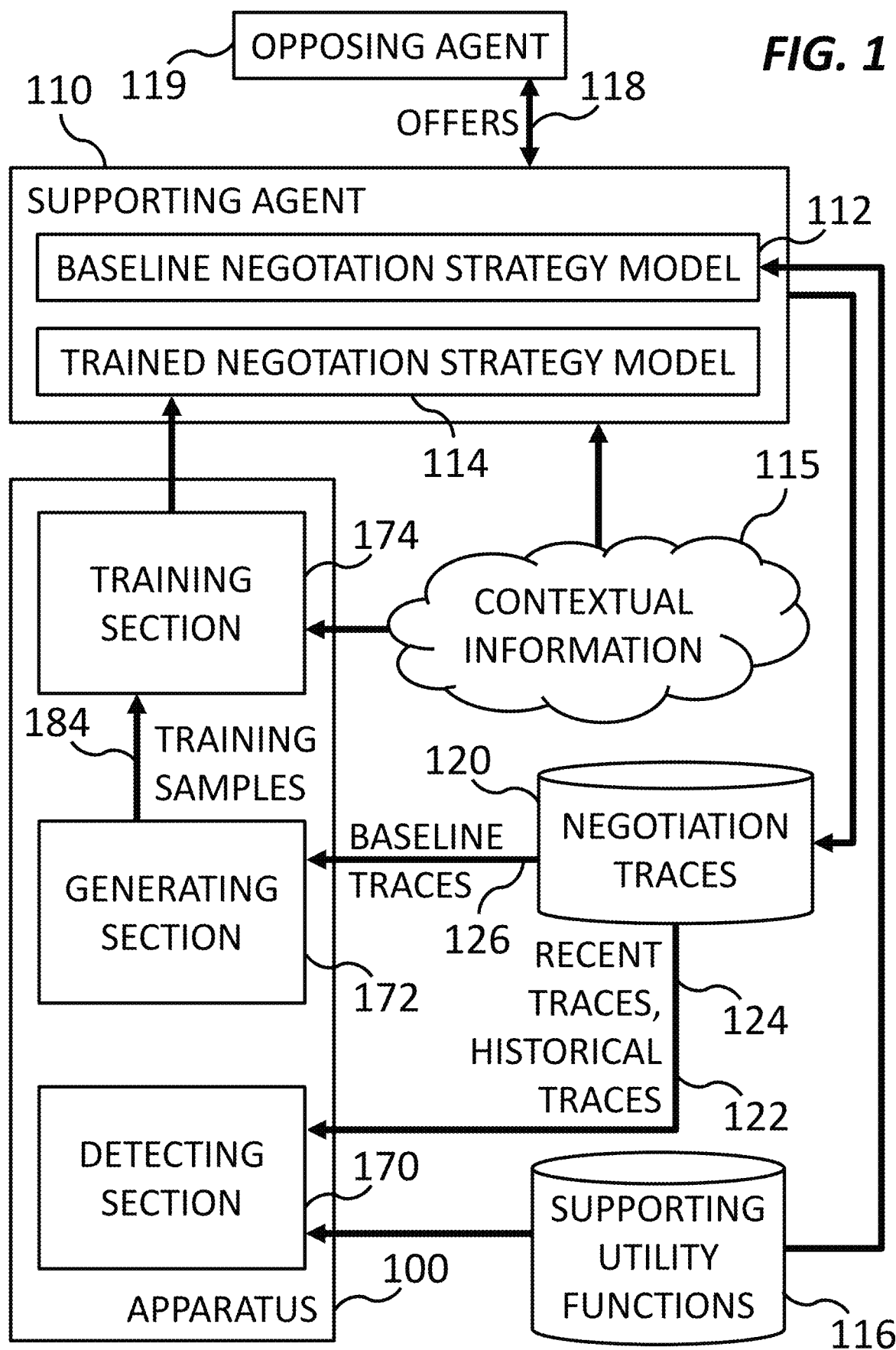
FIG. 1 is a schematic diagram of a system for automated negotiation agent adaptation, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

A bilateral automated negotiation is a negotiation between two automated agents. Repeated negotiations between two fixed entities are a sequential negotiation. An example negotiation scenario consists of the utility functions of each agent and the negotiation domain. An example negotiation protocol is the stacked alternating offers protocol. In at least some embodiments, each agent operates according to a negotiation strategy, which is a combination of an acceptance strategy and a bidding strategy.

In at least some embodiments, a negotiation domain consists of one or more issues. The outcome space of a negotiation is the set of all possible negotiation outcomes, and in at least some embodiments is defined as $$\Omega = \{\omega_1 \ldots, \omega_n\} \quad \text{EQ. 1}$$

where $\omega_i$ is a possible outcome and n is the carnality of outcome space $\Omega$. In at least some embodiments, a utility function assigns a utility value, a real number representing an amount of benefit to the entity, to an outcome $\omega_i$ denoted by $U(\omega_i)$. In many cases, utility functions are private information, and the agents have access to their own utility functions only. In at least some embodiments, a partially ordered outcome set for a utility function U is defined as $$\Omega_U = \{\omega_1, \ldots, \omega_n | U(\omega_1) \geq \ldots \geq U(\omega_n)\}, \quad \text{EQ. 2}$$

in which the final agreed offer is denoted as $\omega^*$, and the corresponding utility value as $U(\omega^*)$ for utility function U. In at least some embodiments, an agent also has a specified reservation value, denoted by $u_r$, which is the benefit that the entity receives in case of no agreement. In at least some embodiments, a trace of a negotiation denoted by T is a sequence of alternating bids by the agents for a single negotiation and is defined by $$T = \{\omega_1^o, \omega_1^s, \ldots, \omega_n^o, \omega_n^s\} \quad \text{EQ. 3}$$

for a bilateral negotiation where $\omega_i^o$, $\omega_i^s$ are the offers by the opponent agent and supporting agent at step i, respectively. In at least some embodiments, the negotiation trace T can be divided into two mutually exclusive and exhaustive sets $T^s = \{\omega_1^s, \ldots, \omega_n^s\}$ and $T^o = \{\omega_1^o, \ldots, \omega_n^o\}$, where $T^s$ and $T^o$ are negotiation traces containing supporting agent offers and opposing agent offers, respectively. In at least some embodiments, a negotiation history denoted by H is a set of negotiation traces for a particular negotiation domain D, and is defined as $$H_D = \{T_1; \ldots; T_k\}, \quad \text{EQ. 4}$$

where k is the number of traces in a negotiation history. For an example domain, a negotiation involving issues of company, storage space, and price of a mobile phone includes values of COMPANY A and COMPANY B as the company, values of 64 GB and 128 GB as the storage space, and values of $900 and $600 as the price. In this example, the domain includes every possible combination of values for the three issues. Since each of the three issues has two possibilities, the total number of possible combinations of values is eight. In this example, a utility function of a buyer is likely to assign higher values to combinations including higher storage space and lower price, whereas a utility function of a seller is likely to assign higher values to combinations including lower storage space and higher price.

If historical data is available, such as a recording of previous negotiation traces, then machine learning techniques are able to be used to create domain specific negotiation strategies. However, such strategies become less competent when a utility function of the opposing agent in a negotiation changes during frequent negotiations.

According to at least some embodiments described herein, a negotiating agent is trained to negotiate from historical data as well as adapt to changes in a utility function of an opposing agent. In doing so, at least some embodiments herein enable negotiating agents to negotiate agreements more efficiently and obtain results of higher benefit in case of changing utility functions. At least some embodiments herein include detecting changes in the utility function of the opposing agent. In doing so, at least some embodiments herein enable negotiating agents to keep learning and improving over time.

In at least some embodiments herein, a parameter-based transfer learning approach involves transferring knowledge through the shared parameters of a current trained negotiation strategy model and a newly trained negotiation strategy model. In at least some embodiments, the current trained negotiation strategy model, which is trained on the source domain, has already learned a well-defined structure, and since the task doesn't change with a change to either utility function, the structure is transferrable to the newly trained negotiation strategy model.

FIG. 1 is a schematic diagram of a system for automated negotiation agent adaptation, according to at least some embodiments of the present invention. The system includes an apparatus 100, a supporting agent 112, and an opposing agent 119. In at least some embodiments, apparatus 100 and supporting agent 112 are one or more computers, such as personal computers, servers, mainframes, instances of cloud computing, etc., including instructions which are executed by a controller to perform automated negotiation agent adaptation.

Apparatus 100 is in communication with supporting agent 110, and includes a detecting section 170, a generating section 172, and a training section 174. In at least some embodiments, detecting section 170 is configured to detect changes in utility functions, such as the supporting utility function of supporting agent 110 and the opposing utility function of opposing agent 119. In at least some embodiments, detecting section 170 is configured to receive recent traces 124 and historical traces 122 from negotiation trace storage 120 for opposing utility function change detection. In at least some embodiments, detecting section 170 is configured to receive current and updated supporting utility functions from supporting utility function storage 116 for supporting utility function change detection.

In at least some embodiments, generating section 172 is configured to generate training samples in response to the detecting section detecting utility function change. In at least some embodiments, generating section 172 is configured to receive baseline traces 126 for training sample generation. In at least some embodiments, generating section 172 is configured to transmit a plurality of training samples to training section 174 for use in negotiation strategy model training.

In at least some embodiments, training section 174 is configured to train negotiation strategy models. In at least some embodiments, training section 174 is configured to receive training samples 184 and contextual information 115 for negotiation strategy model training. In at least some embodiments, training section 174 is configured to transmit a trained negotiation strategy model to supporting agent 110 for use in live automated negotiation.

In at least some embodiments, supporting agent 110 is configured to perform automated negotiation with opposing agent 119, whereby offers 118 are transmitted in alternating sequence until an offer is accepted. In at least some embodiments, supporting agent 110 is configured to operate according to a negotiation strategy model, such as baseline negotiation strategy model 112 or training negotiation strategy model 114. In at least some embodiments, supporting agent 110 is configured to select a counter-offer based on an outstanding offer from opposing agent 119 and contextual information 115. In at least some embodiments, contextual information 115 is dynamic information that impacts the amount of benefit.

In at least some embodiments, baseline negotiation strategy model 112 is an algorithm for selecting offers and counter-offers based on a supporting utility function. In at least some embodiments, baseline negotiation strategy model 112 is not trained specifically for negotiation with opposing agent 119. In at least some embodiments, trained negotiation strategy model 114 is a machine learning model trained for selecting offers and counter-offers. In at least some embodiments, trained negotiation strategy model 114 is trained specifically for negotiation with opposing agent 119.

Figure 2:
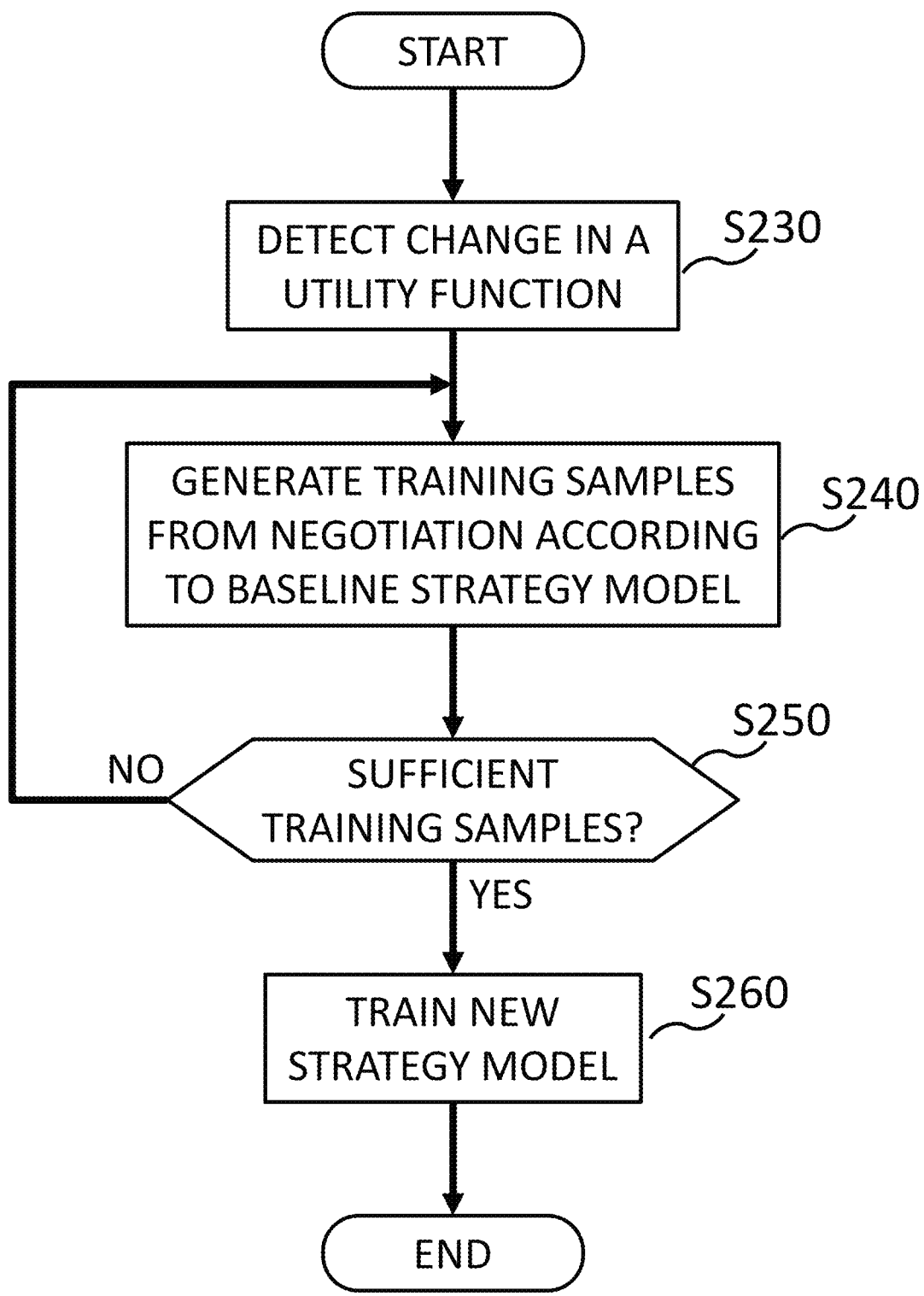
FIG. 2 is an operational flow for automated negotiation agent adaptation, according to at least some embodiments of the present invention.

FIG. 2 is an operational flow for automated negotiation agent adaptation, according to at least some embodiments of the present invention. The operational flow provides a method of automated negotiation agent adaptation. In at least some embodiments, the method is performed by a controller of an apparatus including sections for performing certain operations, such as the controller and apparatus shown in FIG. 7, which will be explained hereinafter.

Figure 3:
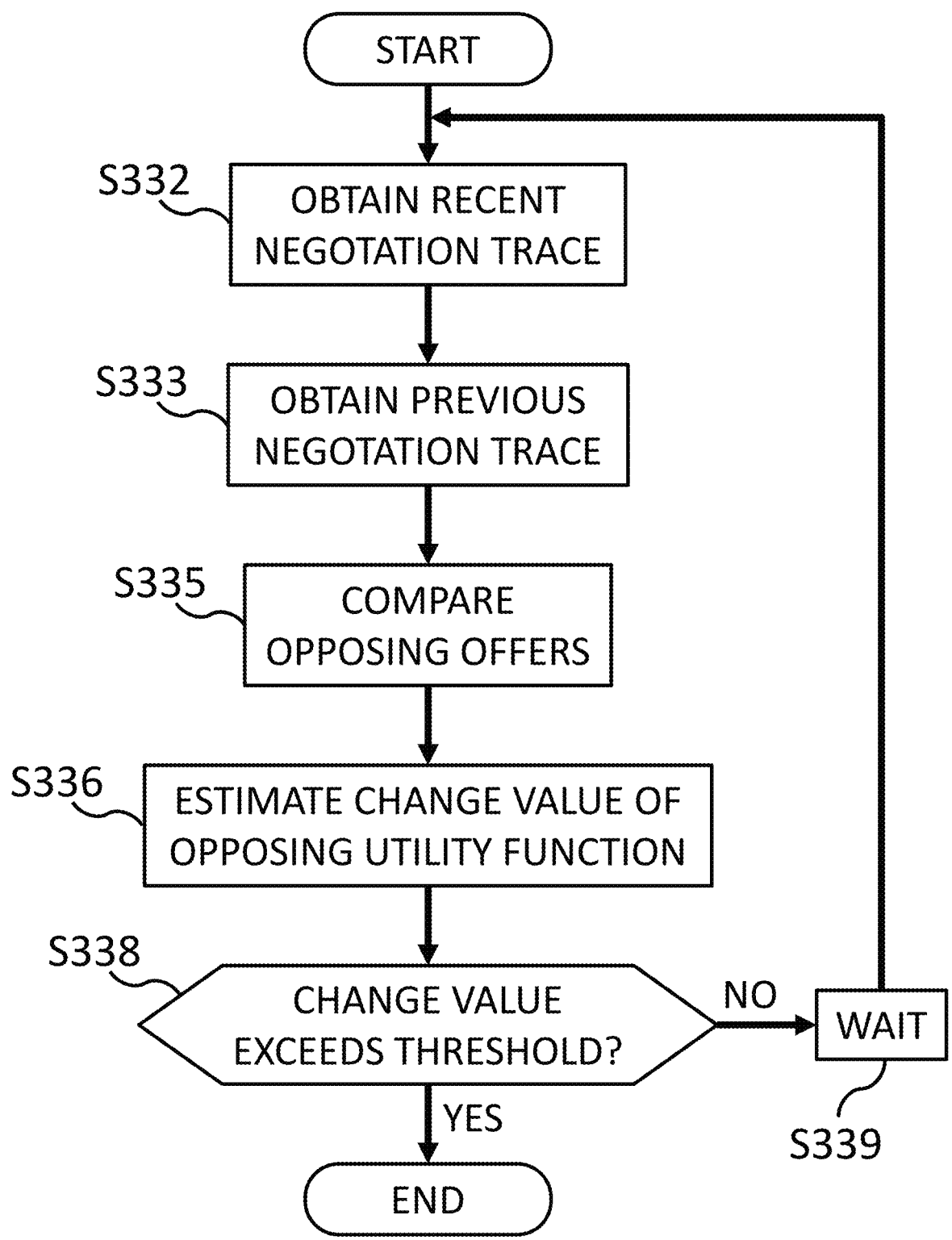
FIG. 3 is an operational flow for opposing utility function change detection, according to at least some embodiments of the present invention.
Figure 4:
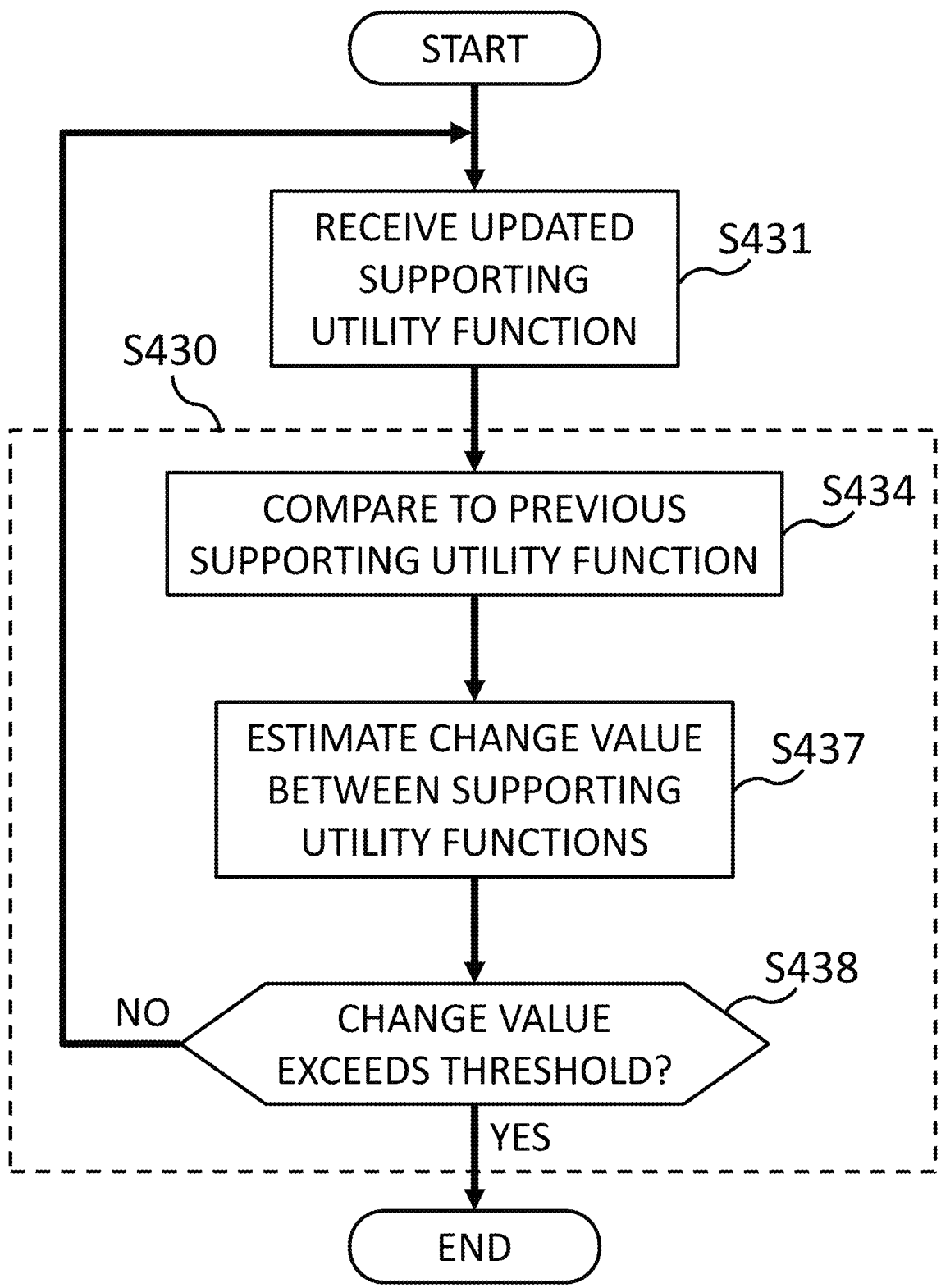
FIG. 4 is an operational flow for supporting utility function change detection, according to at least some embodiments of the present invention.

At S230, a detecting section detects change in a utility function. In at least some embodiments, the detecting section detects change in a utility function involved in automated negotiation between a supporting agent and an opposing agent while the supporting agent operates according to a first negotiation strategy model. In at least some embodiments, the detecting section detects change in an opposing utility function of the opposing agent and a first supporting utility function of the supporting agent. In at least some embodiments, opposing utility function change detection proceeds as shown in FIG. 3, which will be explained hereinafter. In at least some embodiments, supporting utility function change detection proceeds as shown in FIG. 4, which will be explained hereinafter. In at least some embodiments, the detecting section only detects change in one of the utility functions at a time.

At S240, a generating section generates training samples from negotiation according to a baseline strategy model. In at least some embodiments, the generating section generates a plurality of training samples from automated negotiation between the supporting agent and the opposing agent while the supporting agent operates according to a baseline negotiation strategy model. In at least some embodiments, the generating section instructs the supporting agent to negotiate according to the baseline strategy model. In at least some embodiments, the generating section generates training samples from multiple complete negotiations. In at least some embodiments, the generating section generates multiple training samples from each complete negotiation.

At S250, the generating section determines whether a sufficient number of training samples have been generated. In at least some embodiments, the generating section determines whether a sufficient number of training samples have been generated based on the number of training samples. In at least some embodiments, the generating section determines whether a sufficient number of training samples have been generated based one or more qualifications of the training samples. If the generating section determines that a sufficient number of training samples have been generated, then the operational flow proceeds to new negotiation strategy model training at S260. If the generating section determines that a sufficient number of training samples have not yet been generated, then the operational flow returns to training sample generation at S240.

At S260, a training section trains a new negotiation strategy model. In at least some embodiments, the training section trains an initialized negotiation strategy model using the plurality of training samples to produce a second negotiation strategy model. In at least some embodiments, the training section transmits the trained negotiation strategy model to the supporting agent, and instructs the supporting agent to use the trained negotiation strategy model in automated negotiation.

FIG. 3 is an operational flow for opposing utility function change detection, according to at least some embodiments of the present invention. The operational flow provides a method of opposing utility function change detection. In at least some embodiments, the method is performed by a detecting section of an apparatus, such as the apparatus shown in FIG. 7, which will be explained hereinafter.

At S332, the detecting section or a sub-section thereof obtains a recent negotiation trace. In at least some embodiments, the detecting section obtains a recent negotiation trace from automated negotiation between the supporting agent and the opposing agent while the supporting agent operates according to the first negotiation strategy model, the negotiation trace including a plurality of time steps, each time step among the plurality of time steps including an opposing agent offer and a supporting agent offer. In at least some embodiments, the recent negotiation trace is a negotiation trace from the most recent complete negotiation. In at least some embodiments, the detecting section obtains more than one recent negotiation trace, such as negotiation traces from the five most recent complete negotiations. In at least some embodiments, the detecting section obtains the recent negotiation trace directly from a supporting agent or from a negotiation trace storage.

At S333, the detecting section or a sub-section thereof obtains a previous negotiation trace. In at least some embodiments, the detecting section obtains a previous negotiation trace from automated negotiation between the supporting agent and the opposing agent while the supporting agent operates according to the first negotiation strategy model. In at least some embodiments, the previous negotiation trace is a negotiation trace used to generate training samples that were then used to train the first negotiation strategy model. In at least some embodiments, the detecting section obtains more than one previous negotiation trace, such as negotiation traces from the first five complete negotiations using the first negotiation strategy model. In at least some embodiments, the detecting section obtains the previous negotiation trace directly from a supporting agent or from a negotiation trace storage.

At S335, the detecting section or a sub-section thereof compares the opposing offers of the negotiation traces obtained at S332 and S333. In at least some embodiments, the detecting section compares the opposing agent offers of the recent negotiation trace with opposing agent offers of the previous negotiation trace from automated negotiation between the supporting agent and the opposing agent while the supporting agent operates according to the first negotiation strategy model. In at least some embodiments, the detecting section applies a classifier to a tuple of an average frequency distribution of opponent offers in previous negotiation traces and a frequency distribution of opposing offers in the recent negotiation trace.

In at least some embodiments, the classifier is a binary classifier that classifies whether the supporting agent should continue with the current trained negotiation strategy model or should adapt to a new negotiation strategy model for negotiation strategy. In at least some embodiments, the classifier assumes that the opposing utility function and the supporting utility function don't change significantly for a set of consecutive negotiations. In at least some embodiments, $$h^T = \{f^T(\omega_1^o), \ldots, f^T(\omega_n^o)\} \qquad \text{EQ. 5}$$

represents the frequency distribution of opposing agent offers $h^T$, where $f^T(\omega_i^o)$ is the number of occurrences of a specific offer in a negotiation trace T. In at least some embodiments, $$h^H = \left\{ \frac{1}{m}\sum_{j=1}^{m} f^{T_j}(\omega_1^o), \ldots, \frac{1}{m}\sum_{j=1}^{m} f^{T_j}(\omega_n^o) \,\middle|\, T_j \in H \,\forall\, j \in [1, m] \right\} \qquad \text{EQ. 6}$$

denotes the average frequency distribution of opposing agent offers $h^H$ in a negotiation history H, the negotiation history including negotiation traces from multiple previous complete negotiations. In at least some embodiments, the input to the classifier is the tuple $\{h^H, h^{T_{new}}\}$, where $T_{new}$ is the trace of latest negotiation and the output is a Boolean, suggesting whether to continue the use of the current trained negotiation strategy model or train a new negotiation strategy model to adapt to the change in utility function. In at least some embodiments, the classifier uses multiple recent negotiation traces instead of greedily using only the most recent trace.

In at least some embodiments, the classifier is an XGBOOST based classifier for training the classifier where the training data is a synthetically generated dataset using different utility functions with $\{h^{H_1}, h^{H_2}\}$ as input and a binary label as output. In at least some embodiments, the binary labels are generated by actually testing whether the current trained negotiation strategy model trained with $h^{H_1}$ is better than a newly trained negotiation strategy model with $h^{H_2}$. In at least some embodiments, such as during a cold start or when sufficient data is not available to train the classifier, a Wasserstein distance $\mathbb{W}(h_1, h_2)$ or Energy distance $\mathbb{E}(h_1, h_2)$ based algorithm is used to compare opposing offers.

At S336, the detecting section or a sub-section thereof estimates a change value of the opposing utility function. In at least some embodiments, the detecting section estimates a change value representing an amount of change in the opposing utility function. In at least some embodiments, the change value is the output of an opposing offer comparison, such as the operation at S335. In at least some embodiments in which a classifier is used for opposing offer comparison, the output of the classifier is a Boolean, and the final classification between Boolean values is based on a numerical value representing a difference between the groups of opposing offers. In at least some embodiments in which a distance-based algorithm is used for opposing offer comparison, the distance-based algorithm is applied to the tuple $\{h^H, h^{T_{new}}\}$ to produce the estimated change value $$m \leftarrow M(h^H, h_{new}^T) \qquad \text{EQ. 7}$$

where m is the estimated change value, M is the distance-based algorithm, and $M \in [\mathbb{W}, \mathbb{E}]$.

At S338, the detecting section or a sub-section thereof determines whether the change value estimated at S336 exceeds a threshold value. In at least some embodiments, the threshold value is a tunable hyper-parameter. In at least some embodiments, increasing the threshold value results in fewer instances of new negotiation strategy model training, which is more computationally efficient, but with less effective results, while decreasing the threshold value results in greater instances of new negotiation strategy model training, which is less computationally efficient, but with more effective results. In at least some embodiments, the threshold value is tuned to balance the trade-off of efficiency and effectiveness. In at least some embodiments where a classifier is used for opposing offer comparison, the output of the classifier is a Boolean, and the final classification between Boolean values involves comparing a numerical value representing a difference between the groups of opposing offers to the threshold value. In at least some embodiments in which a distance-based algorithm is used for opposing offer comparison, such as EQ. 7, the estimated change value m is compared with a threshold value $\alpha_M$.

If the detecting section determines that the change value exceeds the threshold value, then the operational flow proceeds to an operation of simply waiting at S339, such as for a predetermined time period, before returning to recent negotiation trace obtaining at S332. In other words, in at least some embodiments, the detecting is performed periodically.

If the detecting section determines that the change value exceeds the threshold value, then the operational flow ends. In at least some embodiments, an ending of the operational flow for opposing utility function change detection leads to training sample generation and ultimately new negotiation strategy model training, such as the operations at S240 and S260 of FIG. 2. In at least some embodiments, the generating and training are performed in response to determining that the change value exceeds a threshold value.

FIG. 4 is an operational flow for supporting utility function change detection, according to at least some embodiments of the present invention. The operational flow provides a method of supporting utility function change detection. In at least some embodiments, the method is performed by a detecting section of an apparatus, such as the apparatus shown in FIG. 7, which will be explained hereinafter.

At S431, the detecting section or a sub-section thereof receives an updated supporting utility function. In at least some embodiments, the detecting section receives a second supporting utility function. In at least some embodiments, receiving the updated supporting utility function triggers the supporting utility function change detection. In at least some embodiments, the supporting utility function change detection (S430) includes the operations at S434, S437, and S438, and is performed in response to updated supporting utility function reception at S431. In other words, in at least some embodiments, the detecting is performed in response to receiving the second supporting utility function.

In at least some embodiments, one naive way is to always train a new negotiation strategy model in response to supporting utility function changes, i.e., $U_{new}^s \neq U^s$. In at least some embodiments, the supporting utility function change detection (S430) is skipped in response to receiving an updated supporting utility function, leading directly to training sample generation and ultimately new negotiation strategy model training, such as the operations at S240 and S260 of FIG. 2. However, small changes in the supporting utility function do not always affect the performance of the current trained negotiation strategy model. In at least some embodiments, change in supporting utility function does not always affect the utility values of offers in $T^s$ significantly enough to impact the effectiveness of the current trained negotiation strategy model.

At S434, the detecting section or a sub-section thereof compares the previous supporting utility function to the updated supporting utility function. In at least some embodiments, the detecting section compares the first supporting utility function to the second utility function. In at least some embodiments in which supporting utility functions include an ordered outcome set, such as in EQ. 2, the detecting section compares the order of outcomes between the previous supporting utility function and the updated supporting utility function.

In at least some embodiments, the detecting section measures the change between two utility functions $U_1$ and $U_2$ using a metric $\mathcal{L}_{i:j}(U_1, U_2) \in [0,1]$ based on Levenshtein distance. In at least some embodiments, |o| denotes the length of a partially ordered set o and o[k] denotes the $k^{th}$ element of o where $k \in [0, |o|-1]$. o[k:l] is a subset of o and is defined as $o[k:l]:=\{o[p] \forall k \leq p < l\}$. Then, $$\mathcal{L}_{i:j}(U_1, U_2) = 1 - \frac{L(\Omega_{U_1}[i:j], \Omega_{U_2}[i:j])}{|\Omega_U[i:j]|} \qquad \text{EQ. 8}$$

where $\Omega_{U_1}$ is the partially ordered outcome set for the utility function $U_1$, $\Omega_{U_2}$ is the partially ordered outcome set for the utility function $U_2$, $|\Omega_U[i:j]|=|\Omega_{U_1}[i:j]|=|\omega_{U_2}[i:j]|$ and L is defined as $$L(o_1, o_2) = \begin{cases} |o_1| & \text{if } |o_2| = 0, \\ |o_2| & \text{if } |o_1| = 0, \\ L(o_1[1:|o_1|], o_2[1:|o_2|]) & \text{if } o_1[0] = o_2[0], \\ 1 + \min \begin{cases} L(o_1[1:|o_1|], o_2) \\ L(o_1, o_2[1:|o_2|]) \\ L(o_1[1:|o_1|], o_2[1:|o_2|]) \end{cases} & \text{otherwise} \end{cases}$$

In at least some embodiments using an example, $\mathcal{L}_{i:j}(U_1, U_2)$ with $n < |\Omega_{U_1}|$, the detecting section compares the top n offers for both supporting utility functions by calculating the number of editing operations (insertions, deletions, or substitutions) required to transform $\Omega_{U_1}[0: n]$ to $\Omega_{U_2}[0: n]$.

At S437, the detecting section or a sub-section thereof estimates a change value of the supporting utility function. In at least some embodiments, the detecting section estimates a change value representing an amount of change between the first supporting utility function and the second supporting utility function. In at least some embodiments, the change value is the output of a supporting utility function comparison, such as the operation at S434. In at least some embodiments in which the detecting section measures the change between the supporting utility functions using the metric $\mathcal{L}_{i:j}(U_1, U_2) \in [0,1]$ based on Levenshtein distance, the detecting section derives a change value l using the following relationships:

$$i \leftarrow \underset{k}{\operatorname{argmin}}(\Omega_{U_s}[k] - \gamma_1 \times u_{max}^H) \qquad \text{EQ. 9}$$

$$j \leftarrow \underset{k}{\operatorname{argmin}}(\Omega_{U_s}[k] - \gamma_2 \times u_{max}^H) \qquad \text{EQ. 10}$$

$$l \leftarrow \mathcal{L}_{i:j}(U_{new}^s, U^s) \qquad \text{EQ. 11}$$

where $U^s$ is the previous supporting utility function, $U_{new}^s$ is the updated supporting utility function, $\Omega_{U_s}$ is the partially ordered outcome set for the utility function $U^s$, $u_{max}^H$ is the maximum agreement utility in negotiation history H, and $\gamma_1$ and $\gamma_2$ are hyper-parameters where $\gamma_1 > \gamma_2 > 0$.

At S438, the detecting section or a sub-section thereof determines whether the change value estimated at S437 exceeds a threshold value. In at least some embodiments, the threshold value is a tunable hyper-parameter. In at least some embodiments, increasing the threshold value results in fewer instances of new negotiation strategy model training, which is more computationally efficient, but with less effective results, while decreasing the threshold value results in greater instances of new negotiation strategy model training, which is less computationally efficient, but with more effective results. In at least some embodiments, the threshold value is tuned to balance the trade-off of efficiency and effectiveness. In at least some embodiments which the detecting section measures the change between the supporting utility functions using a metric based on Levenshtein distance, such as EQS. 9-11, the estimated change value l is compared with a threshold value $\alpha \mathcal{L}$.

If the detecting section determines that the change value exceeds the threshold value, then the operational flow returns to updated supporting utility function reception at S431.

If the detecting section determines that the change value exceeds the threshold value, then the operational flow ends. In at least some embodiments, an ending of the operational flow for opposing utility function change detection leads to training sample generation and ultimately new negotiation strategy model training, such as the operations at S240 and S260 of FIG. 2. In at least some embodiments, the generating and training are performed in response to determining that the change value exceeds a threshold value.

Figure 5:
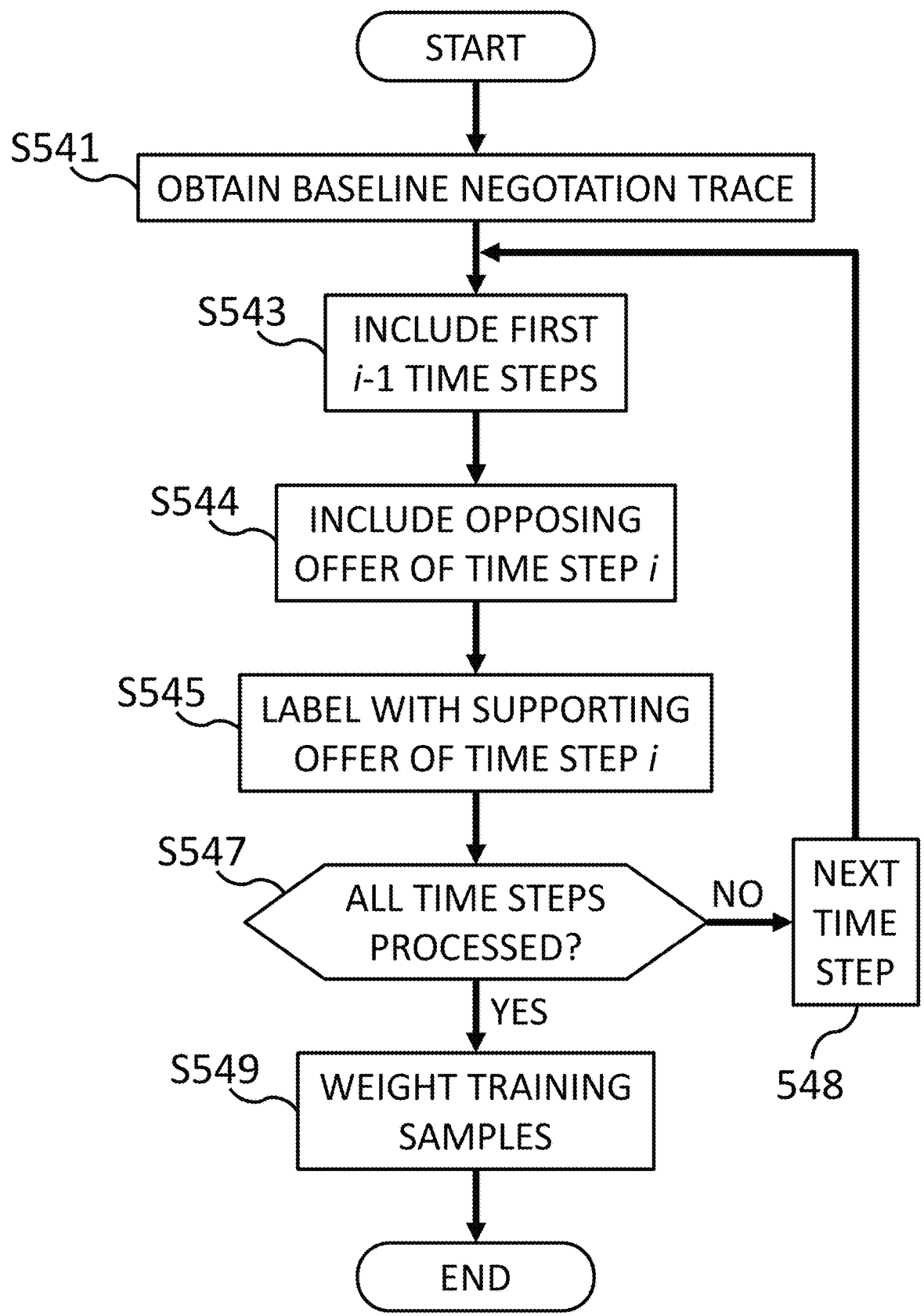
FIG. 5 is an operational flow for training sample generation, according to at least some embodiments of the present invention.

FIG. 5 is an operational flow for training sample generation, according to at least some embodiments of the present invention. The operational flow provides a method of training sample generation. In at least some embodiments, the method is performed by a generating section of an apparatus, such as the apparatus shown in FIG. 7, which will be explained hereinafter.

At S541, the generating section or a sub-section thereof obtains a baseline negotiation trace. In at least some embodiments, the generating section obtains a negotiation trace from automated negotiation between the supporting agent and the opposing agent while the supporting agent operates according to a baseline negotiation strategy model, the negotiation trace including a plurality of time steps, each time step among the plurality of time steps including an opposing agent offer and a supporting agent offer. In at least some embodiments, the generating section obtains multiple negotiation traces while the supporting agent is operating according to the baseline negotiation strategy model. In at least some embodiments, a legacy system is temporarily used as the baseline negotiation strategy model in place of the current trained negotiation strategy model to negotiate with the opposing agent for a small number of complete negotiations to generate a set of a small number of negotiation traces with finally agreed offers denoted as $H^{small}$. In at least some embodiments, the legacy system comprises of single or multiple instances of any type of compatible automated negotiating agents. In at least some embodiments, the generating section obtains the recent negotiation trace directly from a supporting agent or from a negotiation trace storage.

At S543, the generating section or a sub-section thereof begins generating a single training sample by including the first i time steps. In at least some embodiments, the generating section includes the complete set of offers in the training sample from the first i−1 time steps. In at least some embodiments, a complete set of offers from a time step includes an opposing offer and a supporting offer. In at least some embodiments, i is 2 to n, and increases by 1 for each iteration, wherein n is the number of time steps in the negotiation trace.

At S544, the generating section or a sub-section thereof continues generating the single training sample by including the opposing offer of time step i. In at least some embodiments, the opposing offer of time step i is the opposing offer after the complete set of offers in the training sample from the first i−1 time steps included at S543.

At S545, the generating section or a sub-section thereof continues generating the single training sample by labeling the training sample with the supporting offer of time step i. In at least some embodiments, the supporting offer of time step i is included in the training sample in such a way that a training section is able to identify the supporting offer as a label, and not as an input to the model. In at least some embodiments, in the operations at S543, S544, and S545, the generating section generates each training sample among the plurality of samples to include a portion of consecutive time steps among the plurality of time steps from a first time step and an opposing agent offer of a subsequent time step among the plurality of time steps subsequent to the portion as an input, and further includes a supporting agent offer of the subsequent time step as a label. In at least some embodiments, the generating section generates a set of input sequences and labels from every $T \in H_D$ for training where an input sequence $I_t$ to the negotiation strategy model is a sequence of offers until time t and is defined as $I_t = \{\omega_1^o, \omega_1^s, \ldots, \omega_t^o\}$ and the label $O_t = \{\omega_t^s\}$ is the next subsequent supporting offer in T.

At S547, the generating section or a sub-section thereof determines whether all of the time steps in the baseline negotiation trace have been processed. In at least some embodiments, the generating section determines that all time steps in the baseline negotiation trace have been processed once the operations at S543, S544, and S545 have been performed for time step n. If the generating section determines that unprocessed time steps in the baseline negotiation trace remain, then the operational flow returns to S543 to begin generating another single training sample for the next time step after increasing i by 1 at S548. If the generating section determines that all of the time steps in the baseline negotiation trace have been processed, then the operational flow proceeds to training sample weighting at S549.

At S549, the generating section or a sub-section thereof weights training samples. In at least some embodiments, the generating section weights each training sample based on a utility value of the finally agreed offer of the negotiation trace, the utility value obtained by applying a supporting utility function to the finally agreed offer. In at least some embodiments, the generating section overcomes poor model training caused by negotiation traces in a negotiation history $H_D$ having low utility value for the finally agreed offer by using $(U^s(\omega^*_T))^k$ as loss weights for the cross-entropy loss while using the generated input output set from training samples generated from negotiation trace T, where $\omega^*_T$ is the finally agreed offer, $U^s(\omega^*_T)$ is the utility value for the finally agreed offer, and k is a tunable hyper-parameter.

Figure 6:
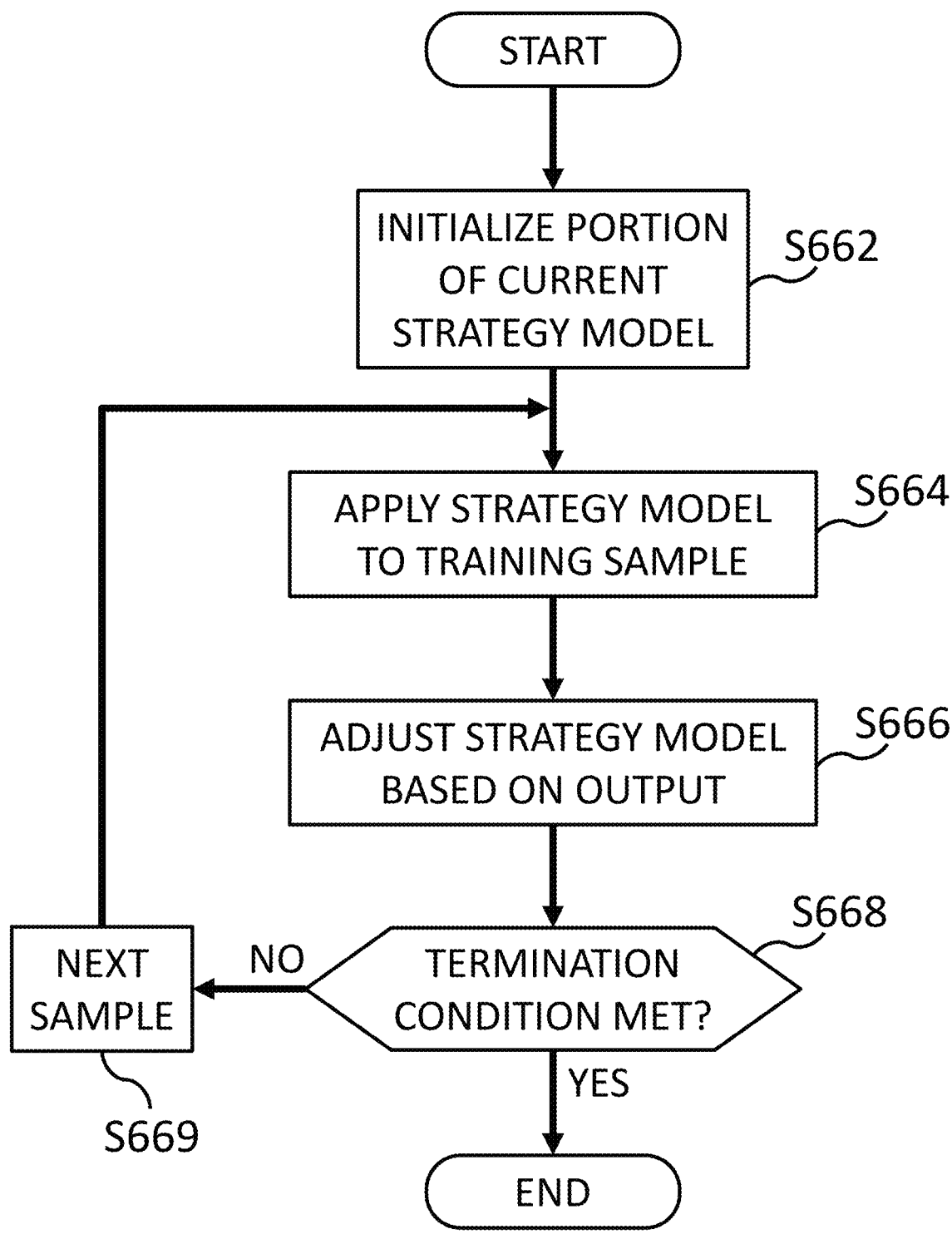
FIG. 6 is an operational flow for negotiation strategy model training, according to at least some embodiments of the present invention.

FIG. 6 is an operational flow for negotiation strategy model training, according to at least some embodiments of the present invention. The operational flow provides a method of negotiation strategy model training. In at least some embodiments, the method is performed by a training section of an apparatus, such as the apparatus shown in FIG. 7, which will be explained hereinafter.

At S662, a training section or a sub-section thereof initializes at least a portion of the current trained negotiation strategy model. In at least some embodiments, the training section initializes a portion of the first negotiation strategy model with random values. In at least some embodiments, negotiation strategy models use a bidirectional Long Short-Term Memory (LSTM) based architecture with an embedding layer at the beginning and a single Dense layer with Softmax activation at the end. In at least some embodiments, the embedding layer captures partial information about the utility functions of both the supporting agent and the opposing agent.

Changes in a utility function cause the performance of the current trained negotiation strategy model to decline in at least some embodiments due to the use of an embedding layer that captures partial information of both utility functions. In at least some embodiments, the embedding layer is retrained when either utility function changes. In at least some embodiments, both the embedding layer and the dense layer are retrained to recapture the new information about the updated opposing or supporting utility function. In at least some embodiments in which the new strategy model training is in response to an updated supporting utility function, the training section reuses the weights and biases of the bidirectional LSTM layer from the current trained negotiation strategy model to reduce the total number of trainable parameters and reduce the time and data utilized to train the model. In at least some embodiments, the training section initializes one or more of an embedding layer and a dense layer with random values while maintaining a bidirectional LSTM layer.

At S664, the training section or a sub-section thereof applies the negotiation strategy model to a training sample. In at least some embodiments, the training section inputs the training sample to the negotiation strategy model and reads the output from the negotiation strategy model. In at least some embodiments, the training section inputs a sequence of offers of the training sample and reads the output supporting offer from the negotiation strategy model. In at least some embodiments, the training section also inputs contextual data to the negotiation strategy model.

At S666, the training section or a sub-section thereof adjusts the negotiation strategy model based on the output from the negotiation strategy model. In at least some embodiments, the training section compares the output from the negotiation strategy model with the label of the training sample. In at least some embodiments, the training section compares the output supporting offer with the actual supporting offer from the baseline negotiation trace that the training sample is labeled with. In at least some embodiments, the training section adjusts the negotiation strategy model by applying a loss function to the output and the label to derive a loss value used to adjust the weights of the negotiation strategy model. In at least some embodiments, the strategy model adjustment at S666 is not performed in every iteration of the operations of S664, S666, S668, and S669, but instead are performed periodically with respect to the number of iterations, or in response to the loss value exceeding a threshold value.

At S668, the training section or a sub-section thereof determines whether a termination condition is met. In at least some embodiments, the termination condition is a number of training iterations, such as several epochs. In at least some embodiments, the termination condition is met when the loss value falls below a threshold value. If the training section determines that the termination condition is not yet met, then the operational flow proceeds to select the next training sample (S669) before returning to strategy model application at S664. If the training section determines that the termination condition is met, then the operational flow ends.

In at least some embodiments, the training section fine-tunes the whole negotiation strategy model with a very small learning rate and for small number of epochs. In at least some embodiments, the finetuning results in better model accuracy, but utility values of finally agreed offers are not greater compared with finally agreed offers reached with negotiation strategy models without finetuning.

Figure 7:
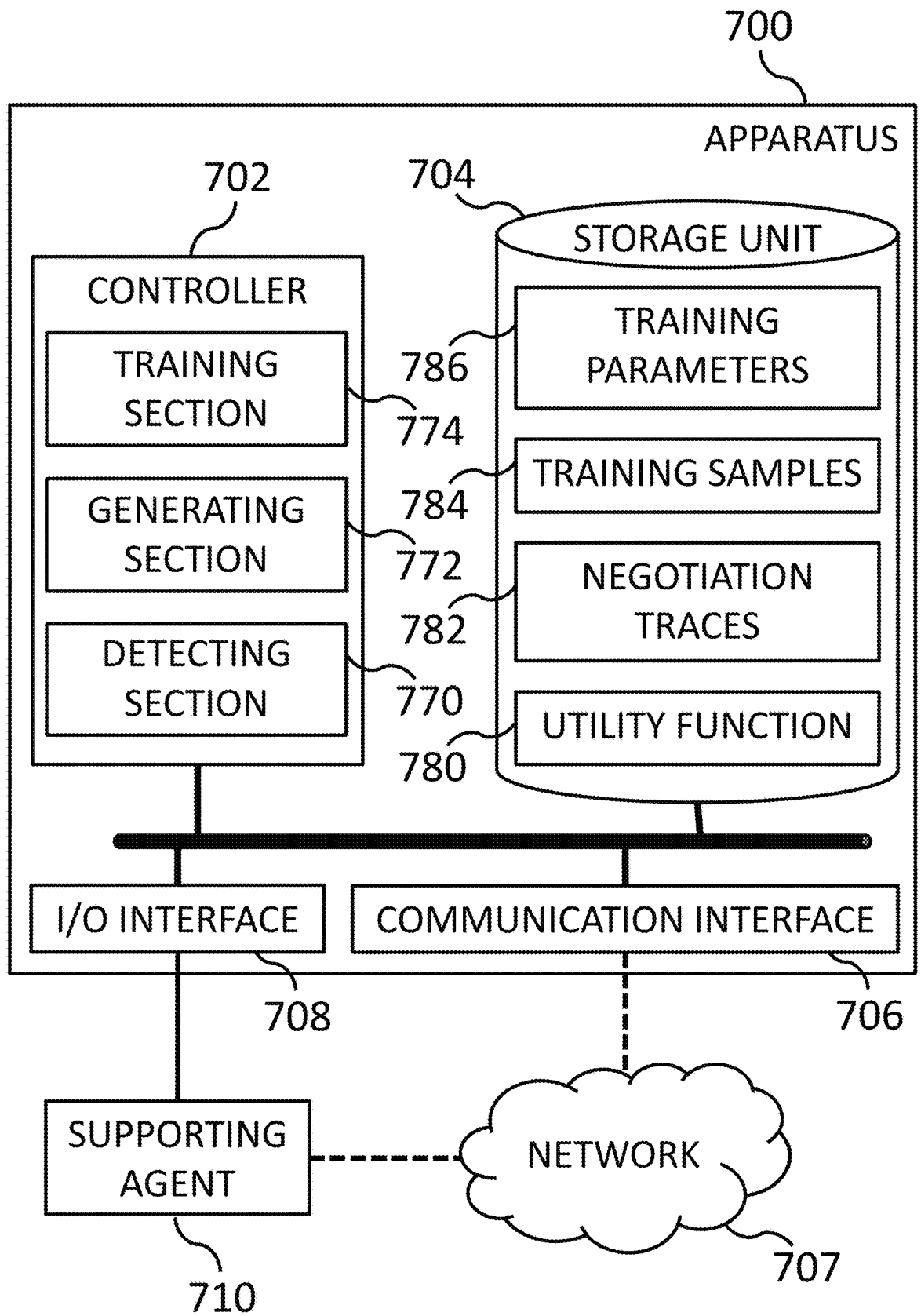
FIG. 7 is a block diagram of a hardware configuration for automated negotiation agent adaptation, according to at least some embodiments of the present invention.

FIG. 7 is a block diagram of a hardware configuration for automated negotiation agent adaptation, according to at least some embodiments of the present invention.

The exemplary hardware configuration includes apparatus 700, which interacts with supporting agent 710, and communicates with network 707. In at least some embodiments, apparatus 700 is integrated with supporting agent 710. In at least some embodiments, apparatus 700 is a computer system that executes computer-readable instructions to perform operations for physical network function device access.

Apparatus 700 includes a controller 702, a storage unit 704, a communication interface 706, and an input/output interface 708. In at least some embodiments, controller 702 includes a processor or programmable circuitry executing instructions to cause the processor or programmable circuitry to perform operations according to the instructions. In at least some embodiments, controller 702 includes analog or digital programmable circuitry, or any combination thereof. In at least some embodiments, controller 702 includes physically separated storage or circuitry that interacts through communication. In at least some embodiments, storage unit 704 includes a non-volatile computer-readable medium capable of storing executable and non-executable data for access by controller 702 during execution of the instructions. Communication interface 706 transmits and receives data from network 707. Input/output interface 708 connects to input device 708 via a parallel port, a serial port, a keyboard port, a mouse port, a monitor port, and the like to exchange information.

Controller 702 includes detecting section 770, generating section 772, training section 774, and transmitting section 886. Storage unit 704 includes utility function 780, negotiation traces 782, training samples 784, and training parameters 786.

Detecting section 770 is the circuitry or instructions of controller 702 configured to detect changes to utility functions. In at least some embodiments, detecting section 770 is configured to detects change in a utility function involved in automated negotiation between a supporting agent and an opposing agent while the supporting agent operates according to a first negotiation strategy model. In at least some embodiments, detecting section 770 utilizes information in storage unit 704, such as negotiation traces 782, and utility function 780. In at least some embodiments, detecting section 770 includes sub-sections for performing additional functions, as described in the foregoing flow charts. In at least some embodiments, such sub-sections is referred to by a name associated with a corresponding function.

Generating section 772 is the circuitry or instructions of controller 702 configured generating training samples. In at least some embodiments, generating section 772 is configured to generate a plurality of training samples from automated negotiation between the supporting agent and the opposing agent while the supporting agent operates according to a baseline negotiation strategy model. In at least some embodiments, generating section 772 utilizes information in storage unit 704, such as negotiation traces 782, and records information in storage unit 704, such as training samples 784. In at least some embodiments, generating section 772 includes sub-sections for performing additional functions, as described in the foregoing flow charts. In at least some embodiments, such sub-sections is referred to by a name associated with a corresponding function.

Training section 774 is the circuitry or instructions of controller 702 configured to train negotiation strategy models. In at least some embodiments, training section 774 is configured to trains an initialized negotiation strategy model using the plurality of training samples to produce a second negotiation strategy model. In at least some embodiments, training section 774 utilizes information from storage unit 704, such as training samples 784 and training parameters 786. In at least some embodiments, training section 774 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the present invention, automated negotiation agent adaptation is performed by detecting change in a utility function involved in automated negotiation between a supporting agent and an opposing agent while the supporting agent operates according to a first negotiation strategy model, generating a plurality of training samples from automated negotiation between the supporting agent and the opposing agent while the supporting agent operates according to a baseline negotiation strategy model, and training an initialized negotiation strategy model using the plurality of training samples to produce a second negotiation strategy model.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable medium including instructions executable by a computer to cause the computer to perform operations comprising:
    detecting change in a utility function involved in automated negotiation between a supporting agent and an opposing agent while the supporting agent operates according to a first negotiation strategy model;
    generating a plurality of training samples from automated negotiation between the supporting agent and the opposing agent while the supporting agent operates according to a baseline negotiation strategy model; and
    training an initialized negotiation strategy model using the plurality of training samples to produce a second negotiation strategy model.

2. The computer-readable medium of claim 1, wherein the utility function is an opposing utility function of the opposing agent.

3. The computer-readable medium of claim 2, wherein the detecting change includes:
    obtaining a recent negotiation trace from automated negotiation between the supporting agent and the opposing agent while the supporting agent operates according to the first negotiation strategy model, the negotiation trace including a plurality of time steps, each time step among the plurality of time steps including an opposing agent offer and a supporting agent offer, and
    comparing the opposing agent offers of the recent negotiation trace with opposing agent offers of a previous negotiation trace from automated negotiation between the supporting agent and the opposing agent while the supporting agent operates according to the first negotiation strategy model.

4. The computer-readable medium of claim 3, wherein
    the detecting further includes estimating a change value representing an amount of change in the opposing utility function, and
    the generating and training are performed in response to determining that the change value exceeds a threshold value.

5. The computer-readable medium of claim 2, wherein the detecting is performed periodically.

6. The computer-readable medium of claim 1, wherein the utility function is a first supporting utility function of the supporting agent.

7. The computer-readable medium of claim 6, wherein the operations further comprise:
    receiving a second supporting utility function;
    wherein the detecting change includes comparing the first supporting utility function to the second utility function.

8. The computer-readable medium of claim 7, wherein
    the comparing includes estimating a change value representing an amount of change between the first supporting utility function and the second supporting utility function, and
    the generating and training are performed in response to determining that the change value exceeds a threshold value.

9. The computer-readable medium of claim 7, wherein the detecting is performed in response to receiving the second supporting utility function.

10. The computer-readable medium of claim 1, wherein the generating a plurality of training samples includes obtaining a negotiation trace from automated negotiation between the supporting agent and the opposing agent while the supporting agent operates according to a baseline negotiation strategy model, the negotiation trace including a plurality of time steps, each time step among the plurality of time steps including an opposing agent offer and a supporting agent offer.

11. The computer-readable medium of claim 10, wherein each training sample among the plurality of samples includes a portion of consecutive time steps among the plurality of time steps from a first time step and an opposing agent offer of a subsequent time step among the plurality of time steps subsequent to the portion as an input, and further includes a supporting agent offer of the subsequent time step as a label.

12. The computer-readable medium of claim 11, wherein the generating the plurality of training samples includes:

weighting each training sample based on a utility value of the finally agreed offer of the negotiation trace, the utility value obtained by applying a supporting utility function to the finally agreed offer.

13. The computer-readable medium of claim 1, wherein the training includes:
generating an initialized negotiation strategy model by initializing a portion of the first negotiation strategy model with random values.

14. A computer-implemented method comprising:
detecting change in a utility function involved in automated negotiation between a supporting agent and an opposing agent while the supporting agent operates according to a first negotiation strategy model;
generating a plurality of training samples from automated negotiation between the supporting agent and the opposing agent while the supporting agent operates according to a baseline negotiation strategy model; and
training an initialized negotiation strategy model using the plurality of training samples to produce a second negotiation strategy model.

15. The computer-implemented method of claim 14, wherein the utility function is an opposing utility function of the opposing agent.

16. The computer-implemented method of claim 15, wherein the detecting change includes:
obtaining a recent negotiation trace from automated negotiation between the supporting agent and the opposing agent while the supporting agent operates according to the first negotiation strategy model, the negotiation trace including a plurality of time steps, each time step among the plurality of time steps including an opposing agent offer and a supporting agent offer, and
comparing the opposing agent offers of the recent negotiation trace with opposing agent offers of a previous negotiation trace from automated negotiation between the supporting agent and the opposing agent while the supporting agent operates according to the first negotiation strategy model.

17. The computer-implemented method of claim 16, wherein
the detecting further includes estimating a change value representing an amount of change in the opposing utility function, and
the generating and training are performed in response to determining that the change value exceeds a threshold value.

18. The computer-implemented method of claim 1, wherein the utility function is a first supporting utility function of the supporting agent.

19. The computer-implemented method of claim 18, further comprising:
receiving a second supporting utility function;
wherein the detecting change includes comparing the first supporting utility function to the second utility function.

20. An apparatus comprising:
a controller including circuitry configured to
detect change in a utility function involved in automated negotiation between a supporting agent and an opposing agent while the supporting agent operates according to a first negotiation strategy model;
generate a plurality of training samples from automated negotiation between the supporting agent and the opposing agent while the supporting agent operates according to a baseline negotiation strategy model; and
train an initialized negotiation strategy model using the plurality of training samples to produce a second negotiation strategy model.

* * * * *